Oct. 11, 1966
P. R. PERINO
3,278,834
WHEATSTONE BRIDGE COMPENSATION CIRCUITS
AND TRANSDUCERS EMPLOYING THE SAME
Filed April 23, 1962
5 Sheets-Sheet 1
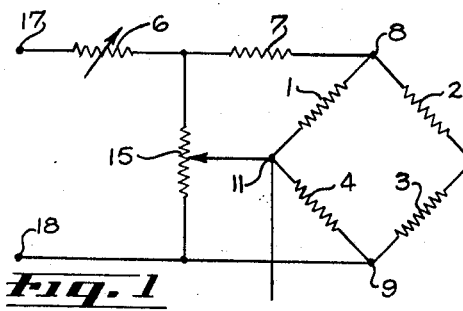
Fig. 1
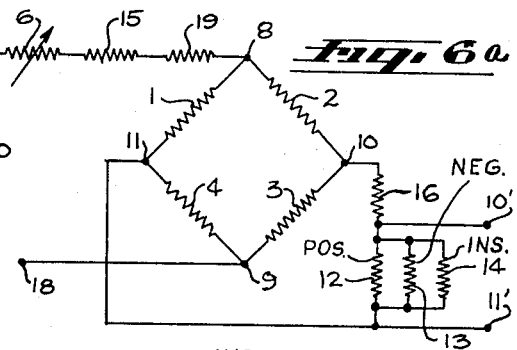
Fig. 6a
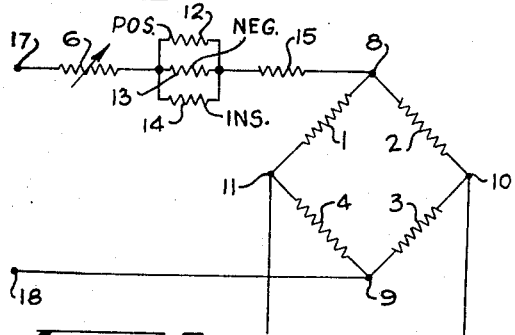
Fig. 5
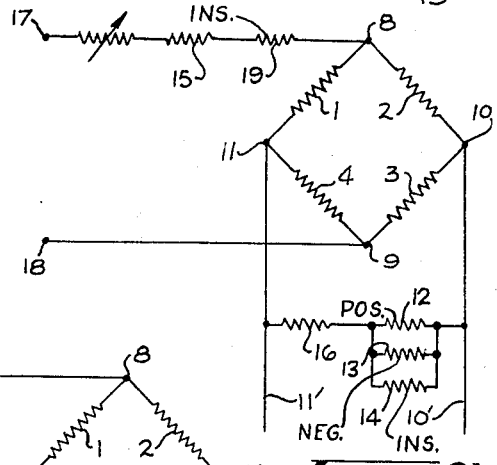
Fig. 6
Fig. 6b
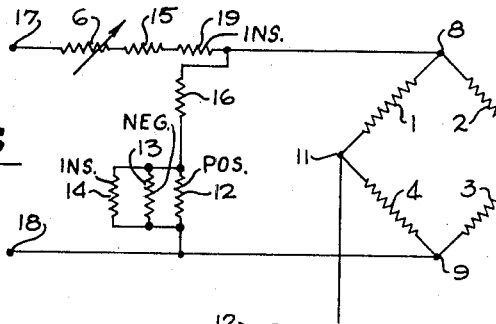
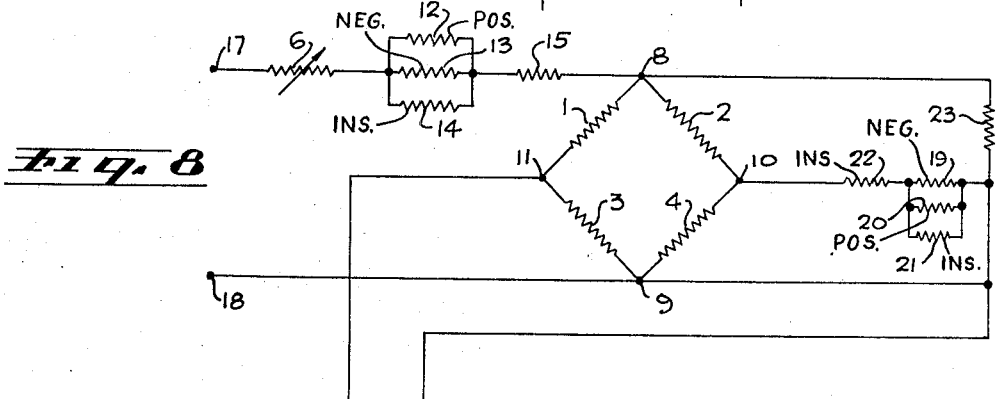
Fig. 8
INVENTOR.
PETER R. PERINO
BY Philip Subkow
ATTORNEY

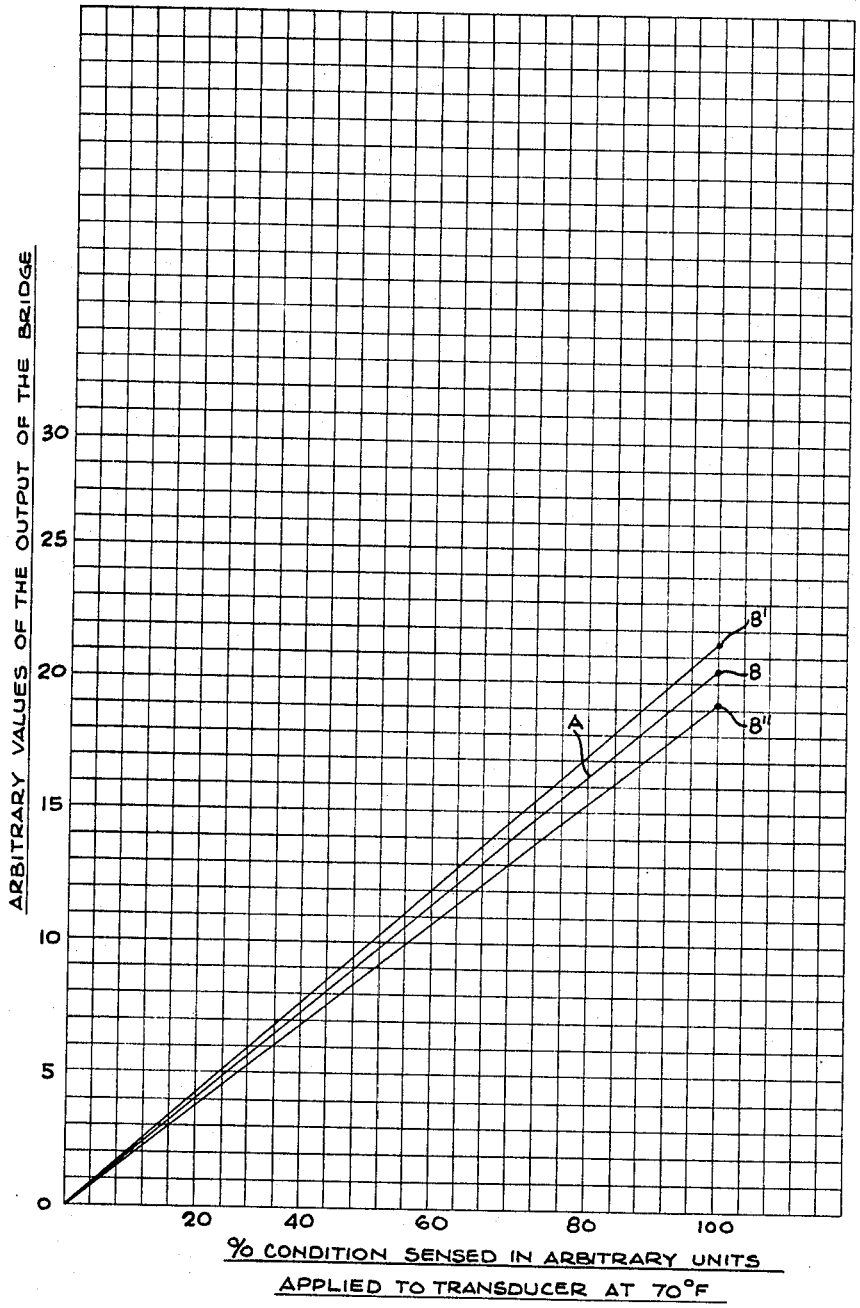

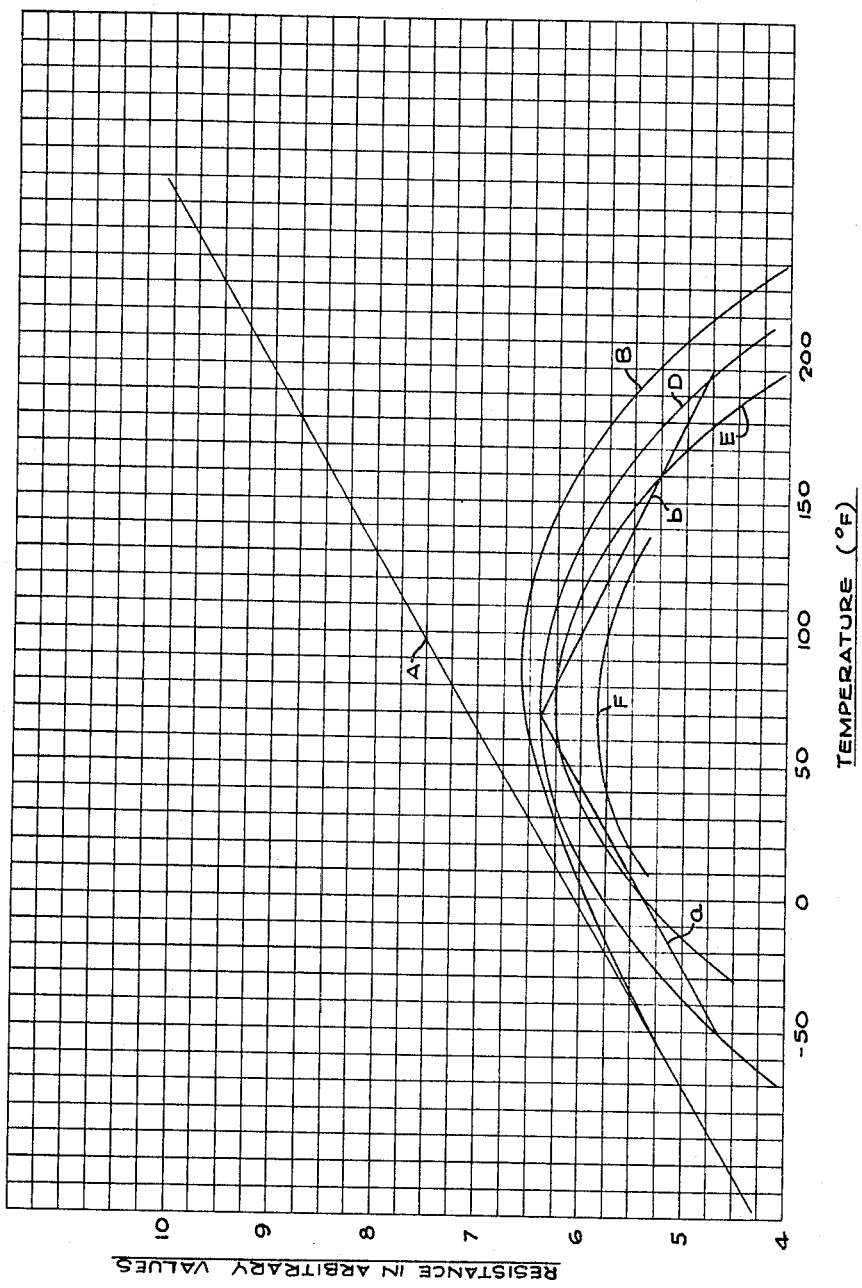

Oct. 11, 1966

P. R. PERINO 3,278,834

WHEATSTONE BRIDGE COMPENSATION CIRCUITS
AND TRANSDUCERS EMPLOYING THE SAME

Filed April 23, 1962

INVENTOR.
PETER R. PERINO
BY
ATTORNEY 3,278,834
WHEATSTONE BRIDGE COMPENSATION CIR-
CUITS AND TRANSDUCERS EMPLOYING
THE SAME
Peter R. Perino, Northridge, Calif., assignor to Statham
Instruments, Inc., Los Angeles, Calif., a corporation of
California
Filed Apr. 23, 1962, Ser. No. 189,620
17 Claims. (Cl. 323—69)

This application is a continuation-in-part of application Serial No. 61,612, filed October 10, 1960, now Patent No. 3,085,193. That application disclosed means for compensating for thermal zero drift in a Wheatstone bridge, such as, for example, is encountered in transducers for sensing a condition such as a force or a displacement. The invention, while not limited to resistance type Wheatstone bridges, is of particular utility in such bridges as, for example, those employing strain sensitive filaments.

There are many examples of this type of transducer. In the most widely used forms thereof, these resistance elements are in the form of filaments which may be of the bonded type or are of the unbonded type now generally known as the Statham strain gages. Examples of such transducers are those shown in the patents referred to below.

In such transducers, the filaments, which may be wires, foil or other strain-sensitive elements whose resistance changes with the imposition of a stress thereon, are mounted upon the device so that the strain-sensitive elements are stressed and result in a change in resistance of such elements, when the condition to be sensed by the transducer is imposed. Such strain-sensitive elements may be metallic filaments in the form of wires or foil, as is conventionally used in the bonded or unbonded strain gages referred to above, or may also be filaments of the semiconductive, or piezoresistive, type. Other types of sensing means whose impedance changes as a result of a condition to be sensed by the transducer include those which include electrical ciruits which participate in giving the intelligence which reports the magnitude of the condition to be sensed, such as those in which an inductance or capacitance bridge is employed.

In some designs a sufficient number of elements are provided so they may form at least one leg, and preferably four legs, of the Wheatstone bridge. They are so compensated that when the transducer is not subjected to the condition to be sensed, i.e., is under zero conditions, the bridge is in balance; and when the transducer is subjected to some force, displacement, or other sensed condition, the elements are differentially affected. For example, in the resistance bridges, the legs of the bridge are affected, so as to change their resistances, and the bridge is unbalanced to give an output potential across the bridge responsive to the magnitude and direction of the sensed condition.

In a four-leg bridge in which each leg has a resistance R, an equal change $\Delta R$ in the resistance of each leg will give an output voltage $V_o$ for an input voltage $V_i$ such that $$V_o = \frac{V_i \Delta R}{R}$$

If $\Delta R$ is zero, the $V_o$ is zero, and the bridge is balanced and under zero conditions.

Examples of such transducers employing strain-sensitive filaments are found in Patents 2,778,624; 2,622,176; 2,453,549 and 2,840,675.

In such transducers, when the ambient temperature is changed, the bridge becomes unbalanced due to differential expansion or contraction of various parts of the transducer, as well as those which inhere in the material employed in the resistors forming the elements of the bridge and in the associated electrical circuitry.

In some designs of transducer the strain-sensitive elements are thus strained in the same manner as if the transducer is subjected to the condition to which the transducer responds. This unbalance, due to temperature when no force or displacement is imposed on the transducer, i.e., when the condition to be sensed is zero or at a chosen level, is termed the thermal zero shift. This shift, in some designs, is fairly linear, so that the thermal zero shift is proportional to the temperature change. In other transducers the thermal zero shift is not linear.

There is another type of influence which temperature has on such transducers in which the impedance of the bridge is affected by the condition to be sensed such as a force or displacement other than temperature. In such devices, the condition to be sensed causes a variation of the impedance of one or more of the legs of the Wheatstone bridge to cause an unbalance. If the bridge be balanced at a given temperature, and the impedance of the legs be changed by application of a force or displacement to the transducer, an output voltage is obtained when the same input voltage is applied to the input corners of the bridge. The volts output per volt input per unit of applied displacement, force or condition to be sensed is termed the sensitivity of the transducer. For transducers which are to produce an output which is to be a measure of the applied condition, it is desirable that the sensitivity be substantially constant up to the full scale of the instrument. When the maximum force or displacement or other condition to be sensed for which the transducer was designed is applied, the resultant value of the volts output per volt input per unit of applied condition is termed the full-scale sensitivity. The difference $(V_o)'$ between the output $V_o$ when the magnitude of the condition to be sensed is zero and the output at full scale is termed the span, and the span per unit of applied condition P is referred to as the span sensitivity factor F. $F = (V_o)'/P$. If the transducer also suffers a thermal zero shift, this shift will also add algebraically to the thermal sensitivity shift.

If the temperature to which the transducer is subjected, i.e., the ambient temperature, is progressively changed from the temperature at which the bridge was balanced, for example, the room temperature, the sensitivity may vary first in one direction and then in the other direction as the temperature is progressively changed upward or downward from room temperature. The variation $\Delta F$ of the full-scale sensitivity factor F thus increases or decreases as the temperature is changed. In some transducers this sensitivity change is a linear function of the temperature. The sensitivity change, however, may vary in a non-linear manner with changes of temperature. Depending on the nature of the mechanical and electrical parameters of the transducer, this variation of the value of F may be linear and increase or decrease with increase of temperature. This variation of the value of F arises from many sources.

The resistivity and thus the resistance electrical components of the bridge circuit change with temperature. Where the impedance change results from the displacement of a member element of the transducer, temperature changes cause differential expansion which may add or subtract from the displacement resulting from the application of the condition to be sensed. Further, where the member is connected by a flexible connection to a frame, the flexible connection usually becomes more flexible as temperature increases. When the transducer is an accelerometer, and the differential movement of the frame on which the mass is suspended with respect to the mass, changes in temperature result both from the variation and the flexibility of the mass supports, but also may result from changes in buoyancy in the liquid used to damp the mass, resulting from changes in the specific gravity and viscosity of the liquid. These same influences also may cause, in some cases, a linear zero shift, and in other cases they may cause a non-linear zero shift.

While proper mechanical design may suppress these effects, it is found in the usual case that there is an F factor variation which may vary in a linear or a non-linear manner with temperature change. For many types of transducers it is found that the variation of the F factor with temperature is non-linear. In some cases, the F factor obtained at calibration at ambient temperature at which it is calibrated increases as the transducer operates at higher or lower ambient temperatures. It is said that such a transducer has a positive hook. For other transducers, the F factor may decrease as the transducer is subjected to either higher or lower temperatures. It is then said that such a transducer has a negative hook.

The reasons why a transducer has a positive or negative hook may arise from many factors inherent in the design and materials employed in the transducer and the associated electrical circuitry. Correction by changing the mechanical design of the transducer is in such cases a difficult trial and error procedure.

Electrical compensation for F factor variation where the F factor varies linearly with temperature is not suitable for transducers which have either a positive or negative hook which departs substantially from linearity.

This invention relates to methods for electrical compensation of transducers employing Wheatstone bridge circuits in which the F factor varies in a non-linear manner with changes in temperature. I have found that by employing a compensating network composed of a resistor having a positive thermal coefficient of resistance, i.e., one whose resistance increases with temperature, hereinafter referred to as a positive resistor, in parallel with a resistor whose resistance decreases with temperature, i.e., a negative coefficient resistor, hereinafter referred to as a negative resistor, I may reduce the variation of the F factor. That is, I may reduce the change in the F factor per unit change in temperature to substantially less than is obtainable without the use of such a compensation network. I may make the variation approach a linear variation. I may so compensate the transducer that the F factor may be substantially and ideally within practical limits equal to the sensitivity at the calibration temperature and desirably, by including compensation for thermal zero shift, obtained at the calibration ambient temperature. I may thus substantially eliminate the so-called hook and obtain a sensitivity which is substantially constant with changes in temperature through the design limits of the instrument or vary in a manner closely approaching linearity. Such a network may then be termed a span compensation network.

The effect of the parallel non-linear network is to modulate the variations in the effective resistance of the bridge so as to oppose the variation resulting from changes in ambient temperature.

The degree of compensation depends on matching the variation in resistance of the compensating network against the variation of the F factor. This may be done experimentally by varying the values of the positive, negative and insensitive resistor, if the same is used. If the equation which gives the variation of the F factor with temperature be established, and the equation which gives the variation of the resistance of the negative and positive resistor is known, then for practical purposes the values of the negative, positive and insensitive resistors required may be obtained mathematically using the approximations described below.

By employing this span composition network in addition to a zero compensation network, I may obtain a transducer which will have a zero and a sensitivity which will be substantially constant up to full scale over a wide range of temperatures and equal to that obtained at calibration.

This invention will be further understood by reference to the drawings, of which:

FIGS. 1, 5, 6, 6A, 6B and 8–11 illustrate circuits to explain and illustrate the circuits of my invention;

FIGS. 2, 3, 4 and 7 are charts illustrating the principles of my invention.

Figure 3:
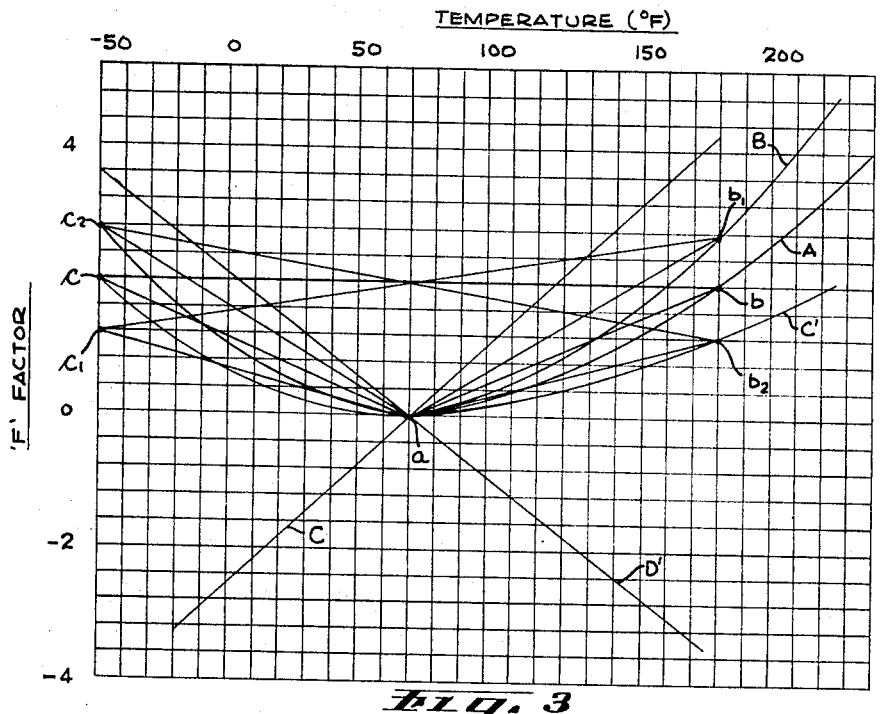

FIG. 1 illustrates a conventional bridge such, as for example, is employed in a transducer in which the sensing element is a strain-sensitive resistor connected in a Wheatstone bridge arrangement as is employed, for example, in the above-listed patents. Thus, in FIG. 1, the legs of the bridge 1, 2, 3 and 4 may be, for example, wires, each of the same material of equal resistance and all of which change equally in resistance on application of a like variation in tension. They may be stressed so that the wires 1 and 3 are in varying tension in a direction opposite to legs 2 and 4. When no such force or displacement is applied to the bridge, that is, with no condition to be sensed applied, the transducer is, if necessary, balanced, for example, by the potentiometer 15 and the input voltage is impressed across the input corners 8 and 9 and controlled by the variable resistor 6. The circuit at FIG. 1 is the bridge circuit. Resistor 6 may be termed the voltage adjusting resistor, and the potentiometer 15 may be termed part of the bridge resistance composed of legs 1 through 4. Resistor 7 may or may not be employed. If used, it is a temperature-sensitive resistor, as explained below. Assume the bridge is balanced at 70° F. so that no voltage output appears at the output corners of the bridges 10 and 11 when the voltage is impressed across the input to the bridge circuit at input corners 8 and 9. This is termed the zero of the transducer. Suppose, now, the condition to be sensed is applied so that the resistance of the legs of the bridges is varied so that the magnitude of the resistance of legs 1 and 3 varies in one direction in the same amount, and the magnitude of the resistance of 2 and 4 varies in a like amount in the opposite direction. An output voltage is obtained at the output corners 10 and 11 of said bridge. If the transducer be truly linear, the output voltage, with the voltage input at 8 and 9 held constant, will vary linearly with the applied condition up to the maximum value of the condition to be sensed, assuming the ambient temperature is maintained constant, or the bridge is balanced at each measurement either manually or automatically by a zero compensating resistor not shown in FIG. 1 but discussed below. The value of the output at this value of the condition is termed the full-scale value, and the ratio of the full-scale value to the magnitude of the condition then applied is termed the span sensitvity F. For a truly linear transducer, this also will be the sensitivity at all values of the condition.

Such a transducer is illustrated by Line A on FIG. 2. Where a thermal zero shift occurs, the zero intercept will be shifted to a positive or negative value of the output at zero, and the lines will be similarly displaced. In such case, the span sensitivity is obtained by algerbraically subtracting from the value of the full-scale output the output at zero.

Because of the inherent non-linearity in the mechanics of transducers arising from the nature of materials and the methods of construction, and also from the nature of the electrical circuits employed, transducers may depart from linearity, and the resultant sensitivity at a constant ambient temperature varies with the magnitude of the condition applied. Thus, for example, such a transducer may give a result illustrated by a curve which is convex. For a well-designed instrument, the maximum departure of the convexity from a straight line is in the order of about one percent or less of the full-scale value. For example, if this were to occur at a point equal to 60 units, the condition of the output of the bridge may be measured as being greater by 1% of the value of the output at point B of line A than is given by line A at 60 units. For many well-designed instrumentation transducers, this may be in the order of .1% or less.

If, however, the ambient temperature be varied even though the bridge be balanced at each temperature to obtain the same zero value, the F value may change. The F factor is the value of the slope of the line at point B at the full-scale point of 100 units of the condition. Thus, point B may shift to B′ or B″. The magnitude of the shift of the F factor per degree of change in temperature may be constant over a range of temperature, i.e., the shift of the F factor is linear with temperature, or the shift may show either a positive or a negative hook.

$$F = F_o[1 + f_1(t)]$$

where:

$F_o$ is the span sensitivity at the calibration temperature,
F is the span sensitivity at any temperature $t$, and
$f_1(t)$ is the temperature function.

Where the variation is linear, this function is "$at$" where "$a$" is a constant.

Figure 4:
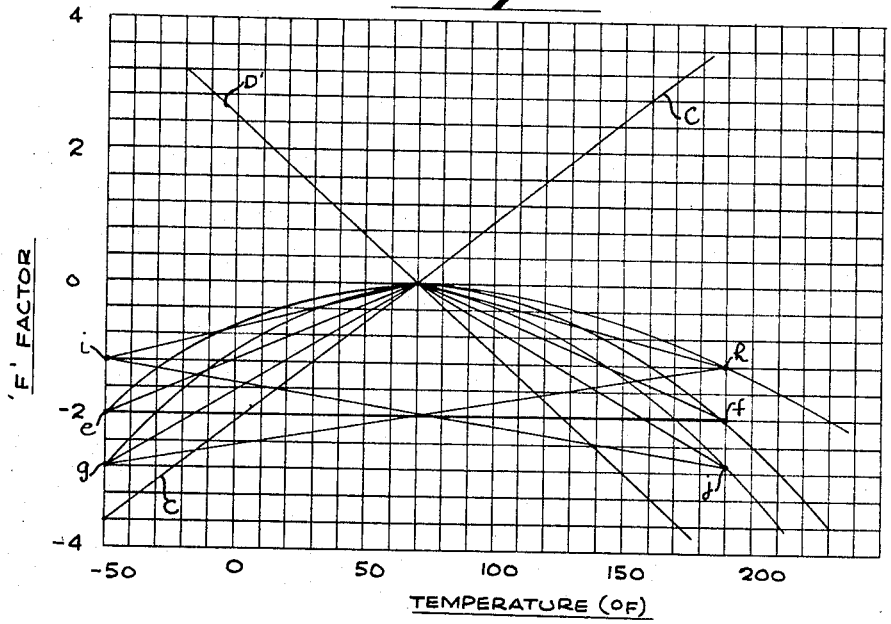

FIGS. 3 and 4 illustrate such non-linear variations. Thus, for example, if the range of the temperature to which the transducer is to be exposed is from −50° F. to +250° F., and the bridge at FIG. 1 is made to traverse the range of values of the condition to be sensed at these various ambient temperatures, with the bridge in zero balance at each temperature, the value of F may traverse the line C of FIG. 3.

This illustrates a linear F shift with positive rotation, since the slope of the line is positive. Line D′ shows a linear shift with negative rotation, since the slope of the line is negative.

Curve A illustrates a transducer with a non-rotated positive hook. The calibration points $b$ and $c$, at equal temperature intervals with the calibration temperature (illustrated on FIG. 3 as 70° F.) form an isosceles triangle $b$–$a$–$c$–, in which the base $c$–$b$ is parallel to the zero axis. Curve B illustrates a positive hook with a positive rotation in which the slope of the base $b_1$–$c_1$ has a positive slope. Curve C′ illustrates a positive hook with a negative rotation in which the slope of the base $b_2$–$c_2$ has a negative slope.

FIG. 4 illustrates linear positive slope C and linear negative slope D′ and a non-rotated negative hook in which the base $e$–$f$ is parallel to the zero axis. This hook may be rotated positively so that the slope of the base is positive to give a negative hook with a positive rotation $g$–$h$, or one with a base whose slope is negative $i$–$j$, to give a negative hook with a negative rotation.

In actual practice, it is only necessary to establish the value of the F factor at calibration temperature and at the two temperatures, one at each side of the calibration factor, and the hook is established by the triangle between these points, as is illustrated by the triangles of FIGS. 3 and 4. Such linear variation as is illustrated in line D′ (positive rotation) is compensated for by introducing a positive resistor 7 in series with one of the input corners of the bridge; or, where the variation is linear and negatively rotated, the negative resistor 7 is chosen. These resistors are chosen so that they have resistance values and coefficients of resistance such as to compensate for the variation in F factor.

Transducers which show an F factor variation according to negative hook or positive hook character, rotated or non-rotated, may not be compensated by the expedient available for compensating the linear F factor variation. A resistor whose resistance is in substantial effect a linear function of temperature in series with the bridge will not result in compensating the non-linear variation of the F factor with temperature. I have found, however, that by employing a circuit element having a non-linear variation of resistance with temperature, its resistance decreasing on either side of a maximum value, i.e., having a resistance which increases with increase in temperature up to a maximum and then decreases in resistance as the temperature is increased beyond the maximum point, I may compensate for transducers showing either a positive or a negative hook. I may also, by employing a postive resistor in addition, compensate for a positive rotation of the hook. A negative resistor in addition compensates for a negative rotation of the hook.

For this purpose I may employ a parallel non-linear resistance network composed in parallel of a positive resistor and a negative resistor. Such resistors are themselves well known. Such a positive resistor may have a resistance which changes substantially linearly with temperature over large values of the temperature change, as will be more fully described below. Negative resistors, also known as thermistors, are also well known. I may in some cases, as will be explained below, employ an additional parallel resistor whose resistance changes but little with temperature, herein referred to as a temperature-insensitive resistor. I may instead employ such a temperature-insensitive resistor in series with the parallel network. They may, in fact, be of resistances which change practically not at all with temperature. Such resistance are well know, a good example of which is a constantan wire. Depending on the conditions, I may or may not employ such a resistor as will be explained below.

The effect of this circuit is that with a constant voltage input applied to the bridge circuit, if the sensitivity of the transducer either increases or decreases in a non-linear manner with changes in temperature, the resistance of the parallel compensation network changes in a manner to vary the voltage applied to the bridge circuit in a manner such that, for like values of the applied condition to be sensed to a zero balanced bridge, a substantially like value of the output voltage is obtained. That is, the span of the transducer may be held substantially constant or, if desired, permitted to vary in a substantially linear manner.

FIG. 5 illustrates the use of my parallel compensation network in zero balanced transducer which has a negative hook when the network is not employed. Zero compensation networks are omitted for clarity and are assumed if required. By selecting the proper values of the positive resistor 12, negative resistor 13, and the insensitive resistor 14, so that the variation in the resistance of the network with temperature causes a variation of the bridge input voltage at the input corners 8 and 9, to compensate for the variation in F for the transducer when not employing the parallel network, I may obtain a transducer whose F value varies less than where the parallel network is not used; that is, it may then remain substantially constant or vary substantially linearly over the desired range of temperatures. If the hook has a positive rotation, I add in series a positive resistor. If the hook has a negative rotation, I employ a negative resistor in place of the positive resistor, as in the case of the rotated linear F variation (of FIG. 3).

Thus, if R, throughout this specification, is the resistance of the bridge at temperature $t_1$ equal to the assumed value of the resistance of each leg, then $r_o[1+f_2(t)]$ equals the resistance $r$ of the compensating network at temperature $t_1$; where $r_o$ is the resistance of the non-linear network composed of 12, 13 and 14, if 14 is used, at the calibration temperature $t_c$; and $f_2(t)$ is the coefficient of change of resistance $r_o$ with temperature over the range $(t_1 - t_c) = t$, i.e., which may be a non-linear or linear change, then I desire to choose the value of $r_o$ and $f_2(t)$ such that the ratio:

$$\frac{F_o[1+f_1(t)]R}{R+r_o[1+f_2(t)]} = \frac{F_o[1+f_1(t)]R}{R+r}$$

is substantially a constant over a useful range of temperature. The closer the value of this ratio is to constancy, the closer will the value of F at various temperatures be to that obtained at the calibration temperature, ignoring the effect of the hooks rotating resistor referred to above.

Desirably, the variation in span sensitivity F under the above conditions should, for practical purposes, be less than 5% and preferably 1% or less. That is, the value of the ratio should be within a range of less than about $1.05F_o$ and greater than about $0.95F_o$, and ideally equal to $F_o$.

In the above charts the value of $t_1$ was taken to be within the range of $-60°$ F. to $250°$ F., and $t_c$ was taken at room temperature, e.g., $70°$ F. However, the temperature limits being determined by the use to which the transducer is to be placed, the limits may be set arbitrarily and are hereby termed the "useful range." The useful range is in part limited by the range of temperature for which negative resistors are designed. Thus, it may be within the range of $-100°$ F. to $+400°$ F., which may also be termed a useful range. Thus, the values of $r_o$ and $f_2(t)$ may be chosen to be such as to give the desired variation of $F_o$ within a temperature range whose limits may vary from about $-100°$ F. to $+400°$ F.

In the following discussion, the above symbols will be used to have the above meanings.

FIG. 6 illustrates an alternative network for varying the voltage applied to the zero balanced bridge. The transducer shows a positive hook when the stabilization network is not employed. Zero stabilization network is assumed if required. A temperature-sensitive voltage divider is employed. The upper leg is a temperature-insensitive resistor 19, whose resistance is symbolized by $R_{19}$, and the lower leg is composed of the parallel positive resistor 12, and a negative resistor 13. The temperature-insensitive resistor 14 in parallel and temperature insensitive resistor 16 in series may be employed or may not be employed. It is to be understood, as in the case of FIG. 5, that the resistors 14 and 16 may be any desired value, or either or both of them may be omitted entirely as will be more fully described below. The compensating voltage divider is composed of 19 as one leg; and the non-linear network, with or without either 14 or 16, or both of them, is the other leg.

As in the case of the circuit of FIG. 5, the series temperature-sensitive resistor 15 is employed in the same way to compensate for a positive or negative rotation, as is described in FIG. 5.

If $r=r_o[1+f_2(t)]$, where $r_o$ is the resistance of the lower leg of the voltage divider and $f_2(t)$ is the temperature function of the resistance, then, in such case, the criterion for selection of the non-linear compensating network (the hook rotating resistor 15 not being employed) is that the expression $$F_o[1+f_1(t)]\left[\frac{Rr}{R_{19}(r+R)+rR}\right]$$

be substantially constant within the limits set forth above over a useful range of temperature. In the above ratio, $f_1(t)$ is the temperature coefficient of the non-linear network composed of resistances 16, 12, 13 and 14 (if used), assuming that the rotating resistor 15 is omitted. The resistance $r_o$ and the function $f_2(t)$ are chosen so that the above ratio is substantially within the limits and the useful temperature range stated above.

FIG. 6A is similar to FIG. 6 except that the compensating network is placed across the output corners 10 and 11 of the bridge and the output is taken at the output terminals 10' and 11' via the voltage divider composed of 16 and the non-linear parallel network across the non-linear network.

In both FIGS. 6 and 6A, the voltage divider is composed of the insensitive resistor, and the non-linear network may be modified by omitting or including the resistors 14 and 16, if required.

In such case, the ratio $$F_o[1+f_1(t)]\left[\frac{r}{R+R_{16}+r}\right]$$

is desirably held within the limits specified above over the useful range of temperature, where $r=r_o[1+f_2(t)]$, and $r_o$ and $f_2(t)$ are the resistance at calibration temperature and temperature function for the network composed of resistors 12 and 13, and 16 and 14, if employed, omitting the hook rotating resistor 15. $R_{16}$ is the resistance of 16.

Instead of taking the output across the non-linear network, I may, as in FIG. 6B, take the output terminals at 10' and 11' across the voltage divider, i.e., across the output corners 10 and 11.

In such case, the criterion for choice of the values of $r_o$ and $f_2(t)$ is that the ratio $$F_o[1+f_1(t)]\left[\frac{R_{16}+r}{R+R_{16}+r}\right]$$

is substantially constant within the limits stated above over a useful range of temperature, as stated above, where again $r_o$ is the resistance and $f_2(t)$ is the temperature function of the non-linear resistance network composed of 12 and 13, and 16 and 14; if used, omitting the hook rotating resistor 15.

Where $r_o$ is the resistance of the non-linear network composed of 12, 13 and 14 if used, $f_2(t)$ is the temperature function of this resistance. $R_{16}$ is the resistance of the temperature-insensitive resistor 16.

In all of the FIGS. 1, 5, 6, 6A, 6B and 8–11, similarly numbered resistors are of the same type, i.e., as to whether they are resistors which are substantially insensitive, negative or positive resistors.

The selection of the values of the resistances to compensate for F shift will be, it is believed, clear from what has been said and will be more fully discussed below.

In FIG. 7, line A is a plot of the resistance of a positive resistor taken as an example. Negative resistors, also known as thermistors, have a resistance which decreases exponentially with increase of temperature. When such a positive resistor is placed in parallel with a negative resistor (not employing resistor 14), the variation of the resistance with temperature will be non-linear, for example, as is illustrated by curve B of FIG. 7.

When such a network is subjected to varying temperatures, its resistance may, for example, follow the curve D. By increasing the value of the positive resistor, the curve may be made more convex and the maximum shifted, as is illustrated by the shift from curve B to curve D. The introduction of a resistor 14 in parallel flattens the curve and reduces the maximum without shifting the temperature at which the maximum occurs, such as is illustrated by the shift from curves D and E. Decreasing the value of the insensitive resistor 14 further flattens the curve, without further shifting the maximum, that is, without changing the temperature at which the maximum occurs, as is illustrated by the shift from curve E to curve F. Thus, the nature of the non-linearity and the position of the maximum resistance is dependent on the values of the negative, positive and insensitive resistors, as well as the coefficients which determine the rates of change of the negative and positive resistor or changes in temperatures. These curves may be established experimentally by varying resistors and making a temperature span of the resistors or mathematically knowing the equations stating the resistance change of the positive, negative and insensitive resistance if used, as a function of temperature, as will be understood by those skilled in this art.

By combining such a network with the bridge in the above manner, the non-linear resistance curve of the compensating network will modify the resistance characteristics of the bridge circuit in a non-linear manner so that, as the temperature is varied, the bridge circuit voltage is varied in a manner to compensate for the variation in the sensitivity factor so as to maintain the sensitivity factor variation within the desired limits.

Thus, having established the variation of the F factor for an uncompensated bridge, for example, one having a hook as is illustrated by A of FIG. 3 or 4, I may be choosing a combination of resistors 12, 13, 14 and 16, so as to give the desired non-linear compensation network, as is illustrated by FIG. 7. According to the criteria described above, I may cause a reduction of the slope of the base of the triangles of FIGS. 3 and 4 drawn to equal temperature intercepts from the calibration temperature, to obtain a bridge with substantially stable sensitivity factor or one which will vary either linearly or non-linearly to the desired extent. The result is to increase the apex angles of the triangle to approach 180° and, if the base of the hook triangle is rotated, by using a suitable resistor 15, I may rotate the base so that the slope is reduced. In the ideal compensation, the F factor variation may be held to an insubstantial amount and be held substantially constant over the temperature range of interest. As a practical approximation, I find that suitable compensations may be made by the following criteria.

In order to match the resistance network to the hook of the transducer, I choose the values of the resistances 12, 13, 14 and 14' to be of such value that I obtain the desired curvature and position of the maximum, so that the average of the slopes of the lines a and b (FIG. 7) drawn to like temperature intervals, as in the case of the hooks described above, be close to and substantially equal to the slope of triangle sides of the uncompensated hook curves of FIGS. 3 and 4, ignoring the signs of the slopes.

As has been described above, it is desirable to adjust the zero at each temperature, since the output of the bridge is affected by the zero setting. Thus, while the span is not substantially affected, the absolute value of the output at full scale is affected. If this is not conveniently to be done at each temperature, automatic zero adjustment may be employed. Where the variation of zero, i.e., with no application of the condition to be sensed, is a linear positive variation, i.e., when the bridge shows a progressively larger output with increasing temperatures under zero conditions, i.e., when no condition to be sensed is applied, I may introduce either in series with one of the legs of the bridge or in parallel with one of the legs, a positive resistor. This form of zero balance compensation for bridges, showing a linear zero thermal drift with or without linear span factor variation, is well known.

Where the zero balance variation is non-linear, however, such compensation is not possible, and I may employ a non-linear zero compensation circuit described in my co-pending application, Serial No. 61,612, filed October 10, 1960, now Patent 3,085,193, or the zero compensation network of the co-pending Baker application, Serial No. 189,517, now Patent 3,111,620. The aforesaid applications are included herein by this reference. The zero balance shift of a transducer without automatic zero drift compensation may be similar in nature to the F balance shift, insofar as the form of the plot of the output produced is concerned, resulting from the effect of temperature on the output of a transducer whose bridge has been initially balanced as the temperature is changed, under zero conditions, from the temperature at which the bridge was initially balanced. We can thus speak of a negative or a positive hook, and each with positive or negative rotation or non-rotated hooks, in the same manner as for like form of F factor variation. We speak of positive and negative hooks with positive or negative rotation, or non-rotated hooks. For example, the transducer illustrated by FIGS. 3 and 4, giving the F factor variation, may also be considered to illustrate the variation of the output of the bridge under zero conditions, i.e., when the magnitude of the condition sensed is not different from that at which the transducer is calibrated, for example, where the condition applied is zero.

In the aforesaid patent, No. 3,085,193, is disclosed a compensation circuit which reduces and, ideally, completely removes the thermal zero shift, so that the bridge under zero conditions of the transducer remains in balance with no voltage across the output corners of the bridge over wide ranges in temperature on either side of the calibration temperature.

Figure 10:
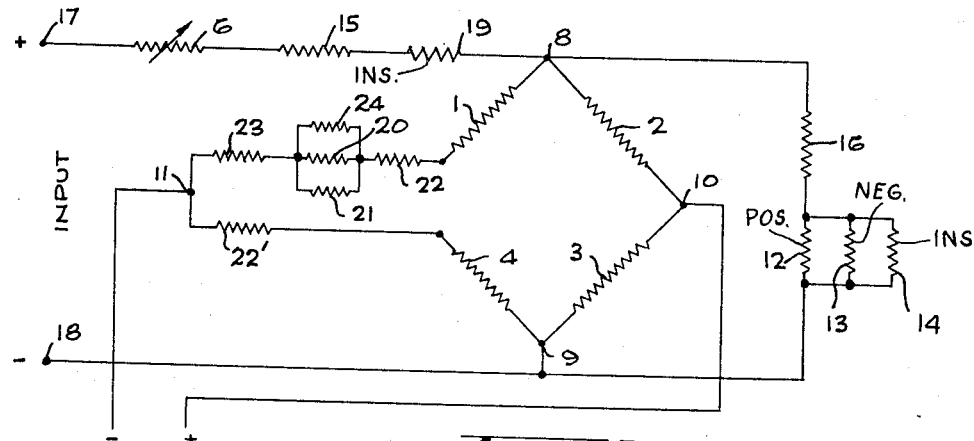
Figure 11:
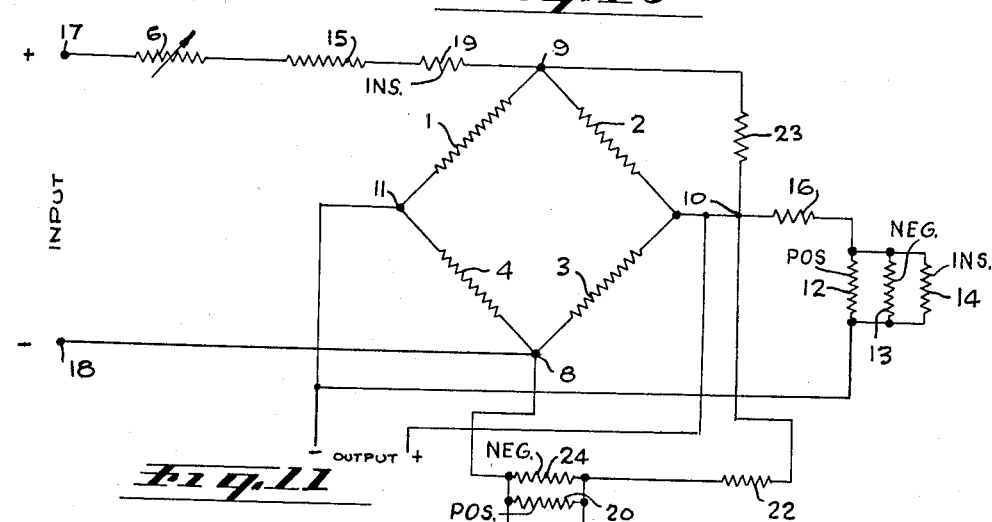

Thus, when the compensated network of FIGS. 5 and 6 has a rotated positive zero shift hook, for example, one similar to B of FIG. 3, I introduce a non-linear compensating network into the negative leg, as shown in FIGS. 10 and 11. This compensating resistance is composed of a positive resistor 24 in parallel with a negative resistor 20, and, if desired, an insensitive resistor 21 or 22, or both 21 and 22.

Figure 9:
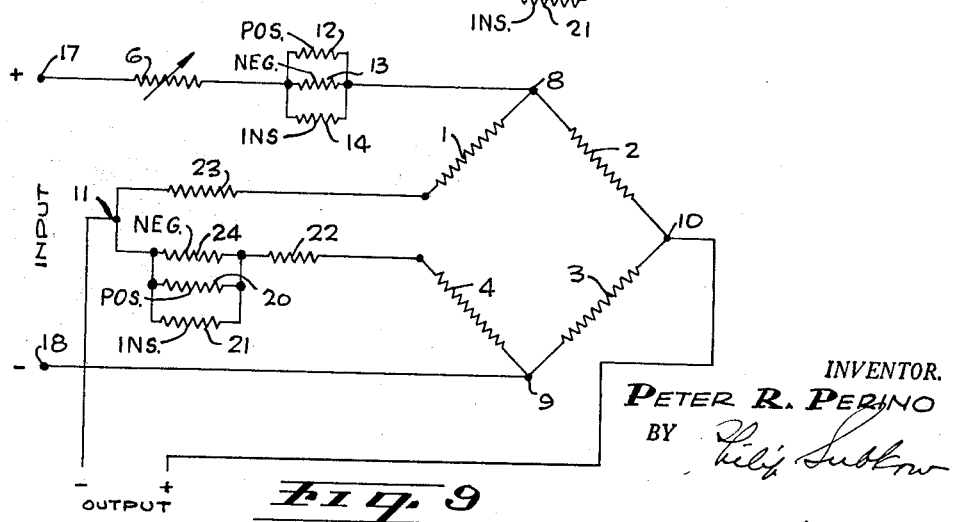

Understanding a positive leg of the bridge as one connected to the positive of the input and positive output voltage, or the diagonally opposite leg, i.e., legs 2 and 4 of FIGS. 9–11, and the negative legs as those connected to the negative pole of the input and positive pole of the output and diagonally opposite legs (see 3 and 1 of FIGS. 9–11), the zero compensating networks are connected either in series or in parallel with the positive or negative legs, depending on the sign of the hook.

Thus, the circuit of FIG. 5 may be modified as in FIGS. 8 and 9, and the circuit of FIG. 6 may be modified as in FIGS. 10 and 11.

Where the original thermal zero shift was a negative hook or positive hook, I employ a network composed of the above non-linear networks employed in producing span compensation as described above. Where the hook is a rotated hook, I may also employ an additional positive resistor. By a proper choice of the resistances and their temperature coefficients, I may make the compensation in the above cases such that the zero shift hook will be reduced and made more linear, and, ideally, may be substantially entirely removed.

Thus, FIG. 9 illustrates zero compensation as applied to the circuit of FIG. 5, and FIG. 10 to that of FIG. 6, FIG. 11 to that of FIG. 6b. In FIG. 9 the uncompensated circuit showed a negative zero hook with negative rotation. The non-linear network, composed of a positive resistor 20 and a negative resistor 24, using insensitive resistors 21 or 22, if desired, is placed in a series with a positive leg and, to compensate for the positive rotation, a positive resistor 23 is placed in series with the negative leg. This also may act to balance the bridge. Where the hook is non-rotated, a balancing temperature-insensitive resistor may replace 23. Where the hook is negative with positive rotation, the positive resistor 23 is placed in series with a positive leg, and the non-linear network is placed in series therewith, and the bridge balanced by an insensitive resistor in series with a negative leg.

When the zero hook is positive with a negative rotation, the positive coefficient resistor and the non-linear network are placed in series with the negative leg, as in FIG. 10, and the additional insensitive resistor, such as 22, may be placed in series therewith, and an insensitive resistor 22' is placed in series with the positive leg, to produce a bridge balance.

Where the positive resistor is employed in series with the compensatory parallel resistor circuit, the parallel resistors may be placed in series with the positive resistor or in the diagonally opposite leg of the bridge, as will be understood by those skilled in this art from the above. Thus, where the positive resistor and the compensatory parallel resistors circuit are to be both placed in the negative leg, they may be in series in the same leg or one in one leg and the other in the diagonally opposite leg of the same polarity.

FIG. 11 shows a non-linear network of the form described in connection with FIG. 9, suitable for compensation of a positive zero hook with a positive rotation and using a positive resistor 23 in the positive leg. If the rotation is negative, the positive resistor 23 is placed in shunt with a negative leg and in series with the non-linear network with a negative leg. In such case, resistance 22 is replaced by 23 and 23 is replaced by the insensitive resistor 22. If the hook be negative with a negative rotation, I may place the resistor 23 in shunt with the negative leg and the non-linear network in shunt with the positive leg.

If the zero hook is negative with a positive rotation, I may use the shunt compensation network of FIG. 11, placing the positive resistor 23 in series with the non-linear network and in shunt with a positive leg.

While I have described particular embodiments of my invention for the purpose of illustration, it should be understood that various modifications and adaptations thereof may be made within the spirit of the invention, as set forth in the appended claims.

I claim:

1. A thermal sensitivity shift compensated transducer for a condition to be sensed by said transducer, said transducer comprising a Wheatstone bridge circuit to sense said condition by the imbalance of said bridge induced by said applied condition, said Wheatstone bridge producing a voltage output from said bridge on application of a voltage to said bridge; electrical circuit means electrically connected to the corners of said bridge to modify said output comprising a non-linear network, said non-linear network comprising in parallel a resistor having a positive temperature coefficient of resistance and a resistor having a negative temperature coefficient of resistance.

2. In the circuit of claim 1, in which said non-linear network includes also a resistor whose resistance does not change substantially with change in temperature connected in parallel with said resistor having a positive temperature coefficient of resistance and said resistor having a negative temperature coefficient of resistance in said network.

3. In the circuit of claim 1, in which said non-linear parallel network is connected in series with one of the input corners of said bridge.

4. In the circuit of claim 3, in which said non-linear network includes also a resistor whose resistance does not change substantially with change in temperature connected in parallel with said resistor having a positive temperature coefficient of resistance and said resistor having a negative temperature coefficient of resistance in said network.

5. In the circuit of claim 1, in which the non-linear network is in series also with a resistor having a positive temperature coefficient of resistance.

6. In the circuit of claim 2, in which the non-linear network is in series also with a positive resistor.

7. In the circuit of claim 3, in which the non-linear network is in series also with a positive resistor.

8. A thermal sensitivity shift compensated transducer for a condition to be sensed by said transducer, said transducer comprising a Wheatstone bridge circuit to sense said condition by the imbalance of said bridge induced by said applied condition, said Wheatstone bridge producing a voltage output from said bridge on application of a voltage to said bridge; electrical circuit means electrically connected to the corners of said bridge to modify said output comprising a non-linear network, said non-linear network comprising in parallel a resistor having a positive temperature coefficient of resistance and a resistor having a negative temperature coefficient of resistance, and a resistor whose resistance does not change substantially with change in temperature, and said non-linear network connected in series also with a resistor having a positive temperature coefficient of resistance.

9. In the circuit of claim 1, in which said parallel network is in series with a resistor whose resistance does not change substantially with change in temperature in a voltage divider, one of whose legs is said resistor and the other of said legs is said non-linear parallel network, said resistor connected in series with one of the input corners of said bridge, and said non-linear network in parallel with said bridge across the input corners of said bridge.

10. In the circuit of claim 9, in which said non-linear network includes also a resistor whose resistance does not change substantially with change in temperature connected in parallel with said negative and positive resistor in said network.

11. In the circuit of claim 9, said non-linear network in series with a resistor whose resistance does not change substantially with change in temperature across said input corners.

12. In the circuit of claim 1, in which said non-parallel network is in series with a resistor whose resistance does not change substantially with change in temperature, forming a voltage divider in which one leg is said insensitive resistor and the other leg is said parallel non-linear network, said voltage divider being electrically connected in parallel with said bridge across the output corners of said bridge.

13. In the circuit of claim 12, in which one of the output terminals of said bridge circuit is taken at one of the output corners and the other output terminal is taken between said legs.

14. In the transducer of claim 3, said transducer having a full-scale sensitivity factor $F_o$ at a calibration temperature whose value varies with temperature according to a function $f_1(t)$, where $t$ is the temperature interval between the calibration temperature $t_o$ and a temperature $t_1$, such that the full-scale sensitivity $F$ at a temperature $t_1$ is $F=F_o[1+f_1(t)]$, where $F$ is the output in volts per volt input to the bridge per unit of applied condition, and $F_o$ is the value of $F$ at temperature $t_o$, and where $R$ is the resistance of any one of said legs of said bridge at the said temperature $t_1$, said resistance of said non-linear network having a value $r_o$ at said calibration temperature $t_c$ and a temperature function $f_2(t)$ such that $$r=r_o[1+f_2(t)]$$

and $$\frac{F_o[1+f_1(t)]R}{R+r}$$

shall have a substantially constant value for values of $t_1$ within the range whose limits are not lower than about $-100°$ F. and not higher than about $+400°$ F.

15. In the transducer of claim 9, said transducer having a temperature-sensitive full-scale sensitivity factor $F_o$ at a calibration temperature $t_c$ whose value varies with temperature according to a function $f_1(t)$ where "$t$" is the temperature interval between the calibration temperature $t_c$ and a temperature $t_1$ such that the full-scale sensitivity $F$ at a temperature $t_1$ is $F=F_o[1+f_1(t)]$, and where $R$ is the resistance of any one of said legs of said bridge at the said temperature $t_1$, said resistance of said non-linear network having a value of $r_o$ at said calibration temperature $t_c$ and a temperature function $f_2(t)$ such that where $r=r_c[1+f_2(t)]$ and where said $R_{19}$ is the resistance of said insensitive resistor of said one leg of the voltage divider, $$F_o[1+f_1(t)]\left[\frac{Rr}{R_{19}(r+R)+rR}\right]$$

shall be substantially constant for values of $t_1$ within the range whose limits are not lower than about $-100°$ F. and not higher than about $+400°$ F.

16. In the transducer of claim 12, said transducer having a temperature-sensitive full-scale sensitivity factor $F_o$ at a calibration temperature $t_c$ whose value varies with temperature according to a function $f_1(t)$, where "$t$" is the temperature interval between the calibration temperature $t_c$ and a temperature $t_1$ such that the full-scale sensitivity $F$ at a temperature $t_1$ is $F=F_o[1+f_1(t)]$, and where $R$ is the resistance of any one of said legs of said bridge at the said temperature $f_1$, and $R_{16}$ is the resistance of said insensitive resistor in series with said parallel, non-linear network, said resistance of said non-linear network having a value of $r_0$ at said calibration temperature and a temperature function $f_2(t)$ such that $r=r_0[1+f_2(t)]$, and such that $$F_o[1+f_1(t)]\left[\frac{r}{R+R_{16}+r}\right]$$

shall be substantially constant for values of $t_1$ within a range whose limits are not lower than about $-100°$ F. and not higher than about $+400°$ F.

17. In the transducer of claim 13, said transducer having a temperature-sensitive full-scale sensitivity factor $F_o$ at a calibration temperature $t_c$ whose value varies with temperature according to a function $f_1(t)$ where "$t$" is the temperature interval between the calibration temperature $t_c$ and a temperature $t_1$ such that the full-scale sensitivity F at a temperature $t_1$ is $F=F_o[1+f_1(t)]$ and where R is the resistance of any one of said legs of said bridge at the said temperature $t_1$, and $R_{16}$ is the resistance of the insensitive resistor in series with said parallel, non-linear network, said resistance of said non-linear network having a value of $r_0$ at said calibration temperature and a function $f_2(t)$ such that $r=r_0[1+f_2(t)]$ and such that $$F_o[1+f_1(t)]\left[\frac{R_{16}+r}{R+R_{16}+r}\right]$$

is substantially constant within a temperature range whose limits are not lower than $-100°$ F. and not higher than $+400°$ F.

References Cited by the Examiner
UNITED STATES PATENTS

| | | | |
|---|---|---|---|
| 2,009,787 | 7/1935 | Rypinski | 338—69 X |
| 2,050,703 | 8/1936 | Johnson | 338—9 X |
| 2,166,935 | 7/1939 | Adams | 324—105 |
| 2,250,712 | 7/1941 | Johnson | 324—105 |
| 2,980,852 | 4/1961 | Mell | 73—88.5 X |
| 3,034,345 | 5/1962 | Mason | 73—88.5 X |
| 3,085,193 | 4/1963 | Perino | 323—69 |
| 3,179,885 | 4/1965 | Knudsen | 324—105 |

JOHN F. COUCH, *Primary Examiner.*

LLOYD McCOLLUM, MILTON O. HIRSHFIELD, *Examiners.*

A. D. PELLINEN, *Assistant Examiner.*